(12) United States Patent
Armstrong et al.

(10) Patent No.: US 7,140,744 B2
(45) Date of Patent: Nov. 28, 2006

(54) LAMP ASSEMBLY FOR A PRESSURE SENSITIVE PAINT MEASURING SYSTEM

(75) Inventors: David W. Armstrong, Ellisville, MO (US); John F. Laramie, St. Louis, MO (US); John F. Donovan, Edwardsville, IL (US); Steven R. Sutton, St. Louis, MO (US); Robert P. Chase, Kent, WA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 10/677,957

(22) Filed: Sep. 30, 2003

(65) Prior Publication Data

US 2005/0068779 A1    Mar. 31, 2005

(51) Int. Cl.
*F21K 2/00* (2006.01)
*G01M 9/00* (2006.01)

(52) U.S. Cl. .................. 362/34; 362/268; 362/276; 362/293; 362/294; 73/147

(58) Field of Classification Search .................. 362/34, 362/268–269, 276, 293–294, 311, 372–373, 362/418; 356/402–425; 73/147
See application file for complete search history.

(56) References Cited

U.S. PATENT DOCUMENTS 5,359,887 A    11/1994    Schwab et al.
5,731,995 A    3/1998    Benne et al.

*Primary Examiner*—Sandra O'Shea
*Assistant Examiner*—Jason Moon Han
(74) *Attorney, Agent, or Firm*—Harness Dickey & Pierce P.L.C.

(57) ABSTRACT

A lamp assembly for use in a pressure sensitive paint measuring system, such as for measuring pressure on a test air vehicle using pressure sensitive paint, is constructed and configured to provide (1) exceptional cooling for the various optical elements and the housing, (2) a combination of filters that minimizes heat load on the interference filter, yet provides a high beam intensity at the desired wavelength, (3) a mounting structure for the lamp assembly that allows the lamp assembly to be accurately aimed and positioned with little translation of the output aperture, and (4) easy access to the internal components, including the bulb-reflector assembly and optical elements.

32 Claims, 15 Drawing Sheets

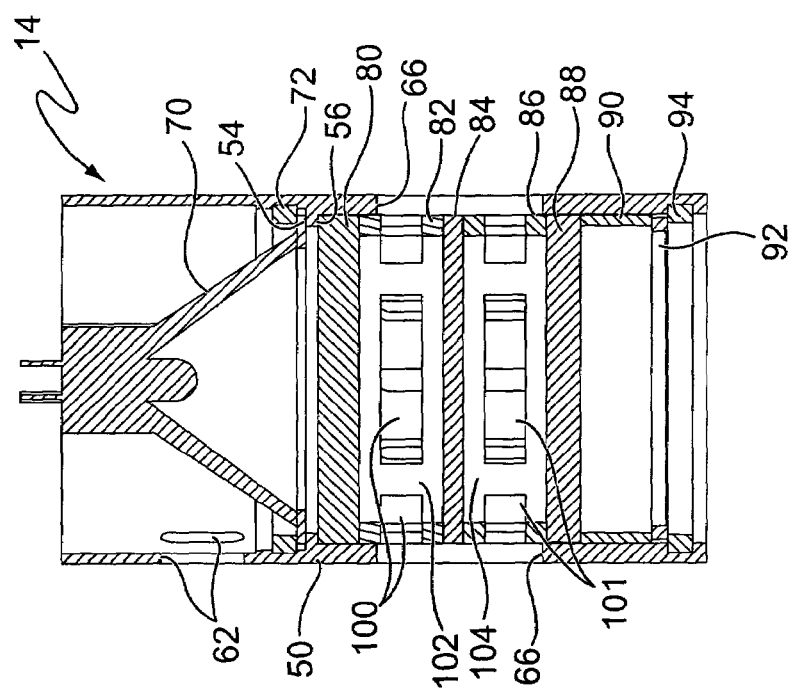
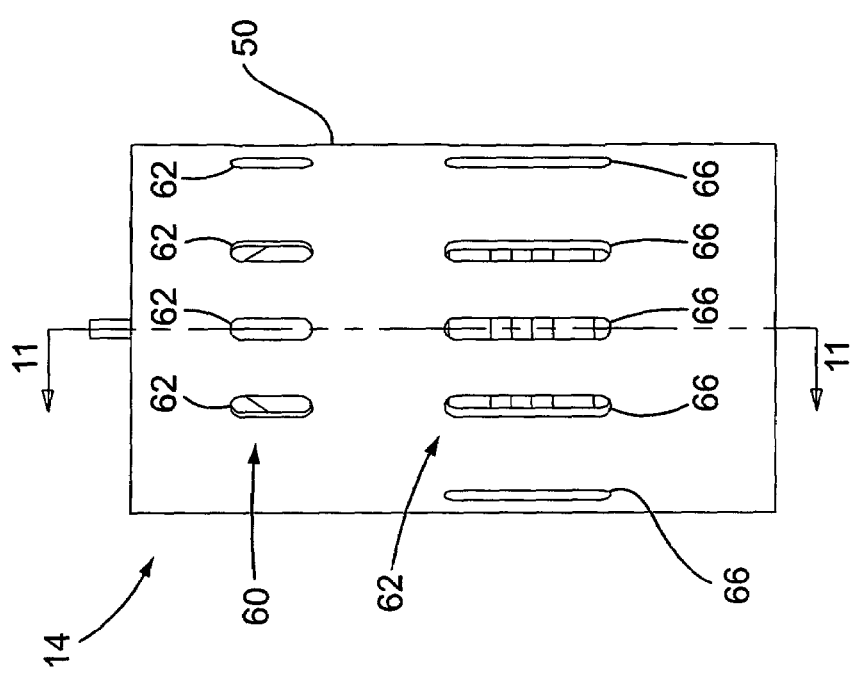
Fig. 11
Fig. 10

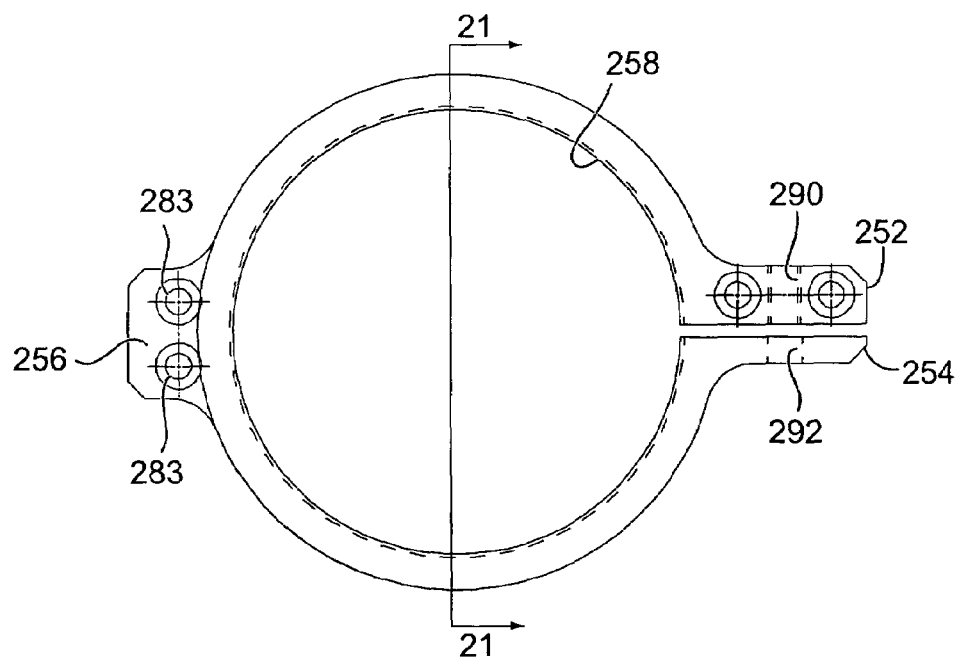
Fig. 19
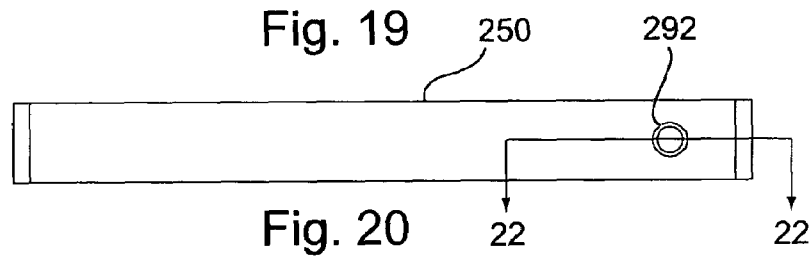
Fig. 20
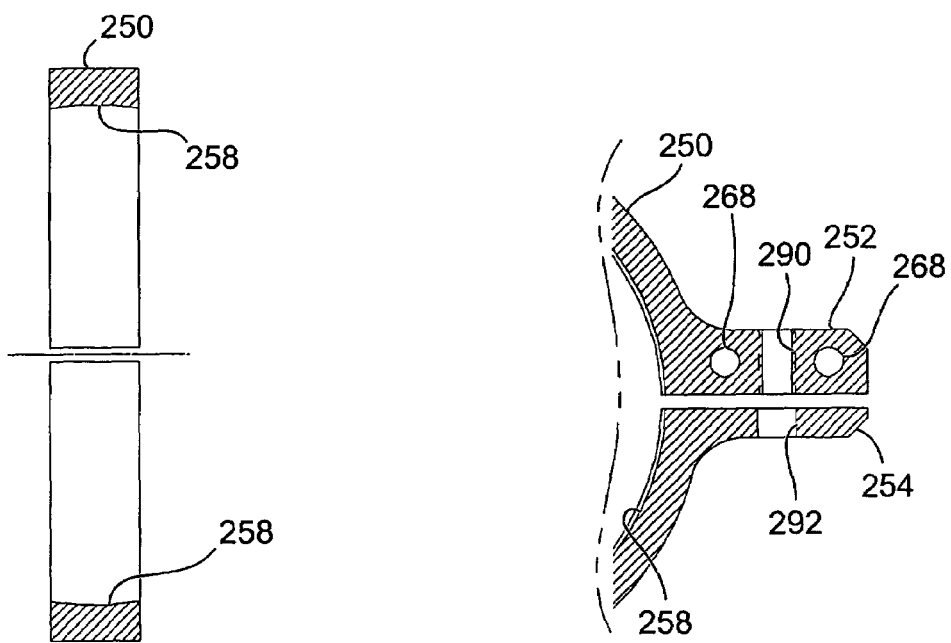
Fig. 21
Fig. 22

LAMP ASSEMBLY FOR A PRESSURE SENSITIVE PAINT MEASURING SYSTEM

BACKGROUND OF THE INVENTION

This invention is directed to a lamp assembly, and more particularly a lamp assembly for use in measuring pressure on a surface painted with pressure sensitive paint.

Accurate determination of aircraft component loads from wind tunnel testing is critical to the development of any air vehicle. Traditional techniques utilize many surface pressure taps distributed over the surface of a wind tunnel model to obtain an estimate of the surface pressure distribution. Physical and mechanical constraints of typical test articles limit the number of pressure taps that can be used to define the actual surface pressure distribution over the entire surface. Pressure taps provide a reading of the pressure at one point only on the surface, and must be connected to pressure transducers by using individual flexible tubing. A wind tunnel model can easily require a large number of such taps, such that the total installation cost for testing a particular model can become quite high. Moreover, while such taps provide readings of the pressures at the points where such taps are installed, it becomes a significant challenge when using taps alone to determine the air pressure between the tap locations, which is required in order to create a complete surface pressure map over the entire air vehicle which then can be used to determine the integrated loads on various aerodynamic surfaces.

The traditional method requires a significant amount of manual interaction and creative engineering judgment. Inherent inaccuracies exist in this approach since there is a high probability that localized flow features are missed by the taps alone. Wind tunnel testing is a pacing item in the length of the design cycle of an aircraft, and a shortened cycle results in significant cost savings.

Pressure sensitive paint (PSP) requires only a few surface pressure taps and uses an optical technique to obtain the pressure at every point over the model surface. Although the pressure transducers are more accurate than the PSP at a given point, that PSP provides a continuum of pressure over the model produces a significant advantage over the traditional approach. In addition, the process by which the pressures are transformed onto a finite element model of the aircraft is significantly shortened.

In making accurate PSP measurements to determine aircraft component loads, the requirements for the PSP illumination system have become even more critical. The illumination source must be (1) extremely stable in time while also withstanding changes in temperature and pressure, (2) provide the proper wavelengths of light with very little or no leakage in the detection band, and (3) be easy to install, adjust, and remove from the test facility. Equally important, the illumination source must be protected from overheating to avoid failure.

SUMMARY OF THE INVENTION

The present invention is an improvement over prior art illumination sources, or lamps, for pressure sensitive paint measurement. Thus, generally in accordance with the invention, there is provided a cooling system for the light source and various optical elements, as well as the housing, to keep these components cool during operation. Further, generally in accordance with the invention, there is provided a mounting system that provides easy halogen bulb assembly replacement as well as access to the optical elements, without having to dismount the lamp assembly housing. Further, generally in accordance with the invention, there is provided a swivel mount assembly that allows the lamp to be aimed and adjustably secured into position on the test structure with little translation of the output aperture, which is particularly important when aiming the lamp through small viewing ports in the walls of a wind tunnel during testing. Still further the invention generally provides a unique combination of optical filters that minimizes heat load on the interference filter, yet provides high illumination at the desired wavelength.

Further features and advantages of the present invention, as well as the structure and operation of various embodiments of the present invention, are described in detail below with reference to the accompanying drawings.

BRIEF DESCRIPTION OF THE DRAWINGS

FIG. 10 is a side elevation view of the assembly of FIG. 9.

FIG. 11 is a view in section taken along the line 11—11 of FIG. 10.

FIG. 19 is an end elevation view of the mounting ring of the lamp assembly of FIG. 1.

FIG. 20 is a side elevation of the mounting ring.

FIG. 21 is a view in section taken along the line 21—21 of FIG. 19.

FIG. 22 is a view in section taken along the line 22—22 of FIG. 20.

FIG. 29 is an end elevation view of the L-bracket of FIG. 28.

FIG. 30 is a view in section taken along the line 30—30 of FIG. 29.

DETAILED DESCRIPTION OF THE PREFERRED EMBODIMENTS

Figure 1:
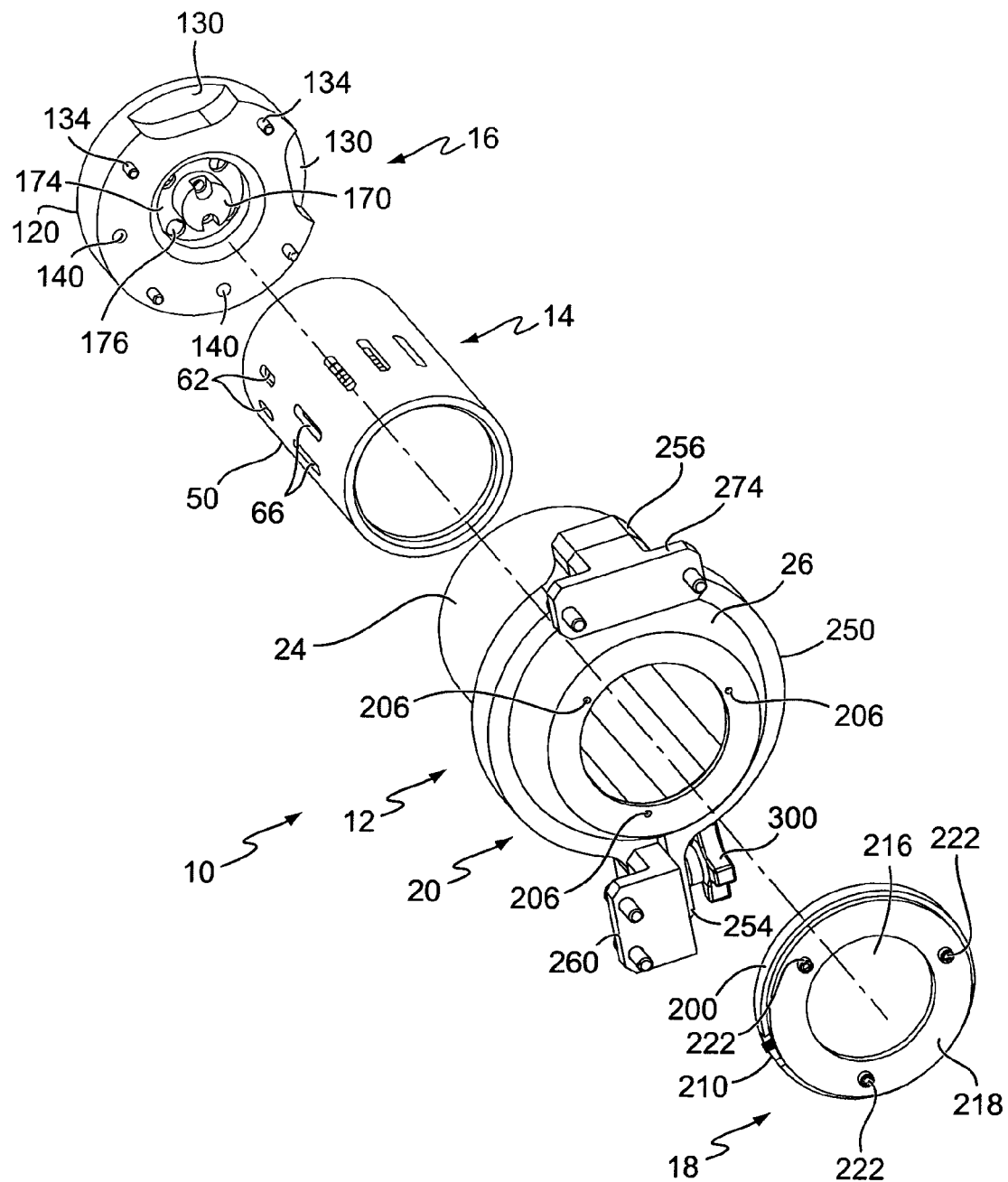
FIG. 1 is an exploded view of a lamp assembly of a preferred embodiment of the invention.
Figure 2:
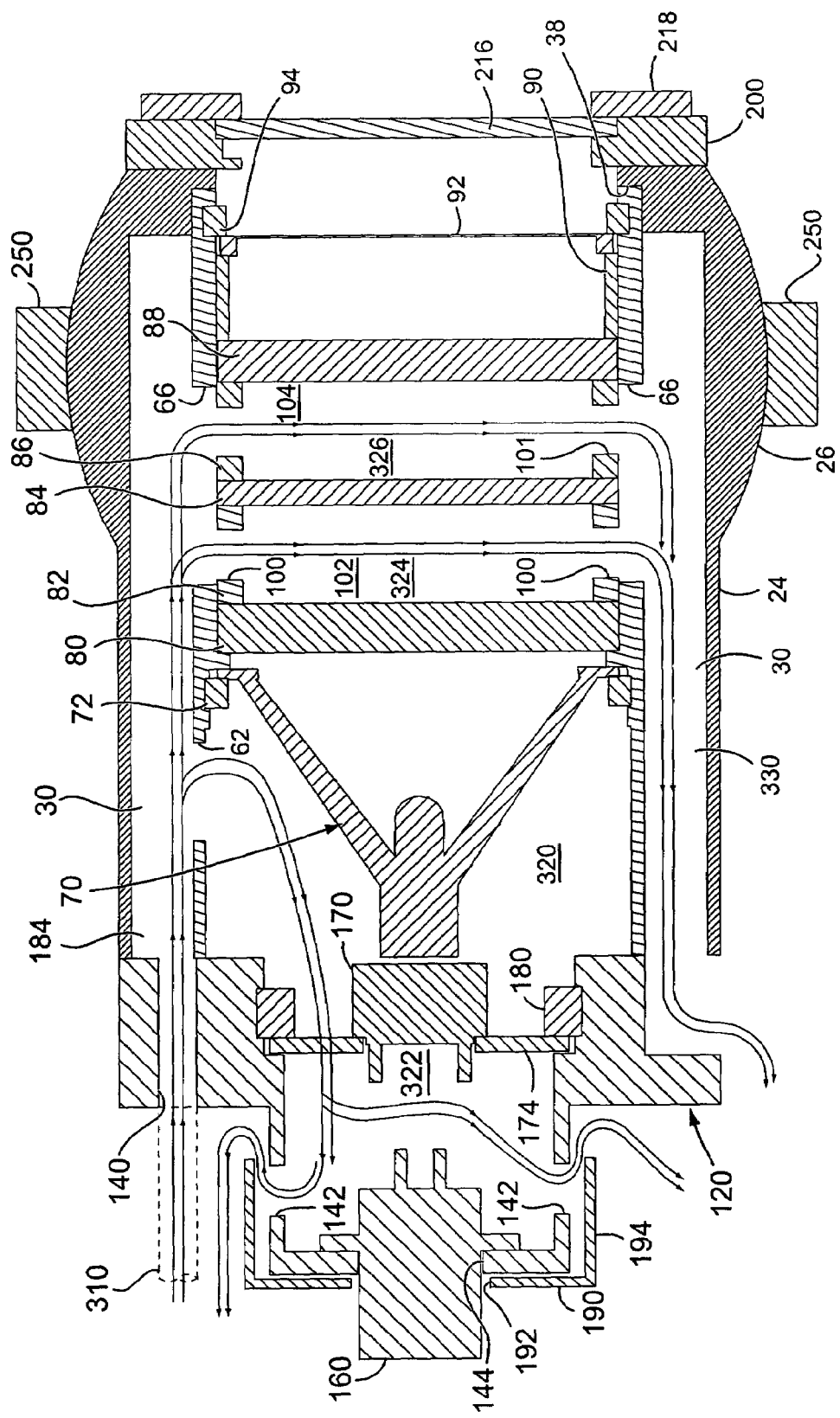
FIG. 2 is a sectional view taken along a longitudinal axis of the lamp assembly of FIG. 1.
Figure 4:
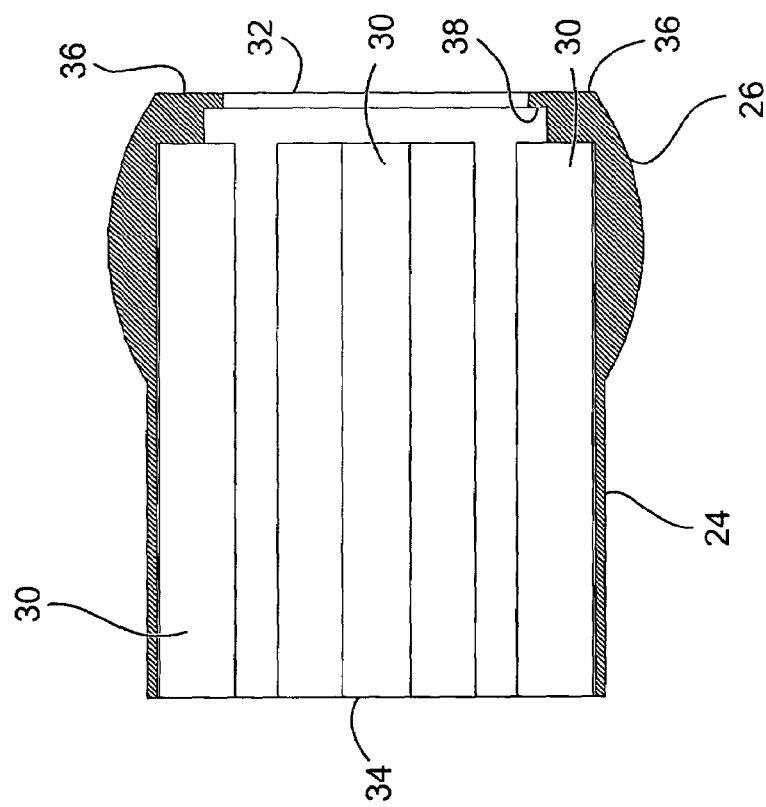
FIG. 4 is a view in section taken along the line 4—4 of FIG. 3.
Figure 3:
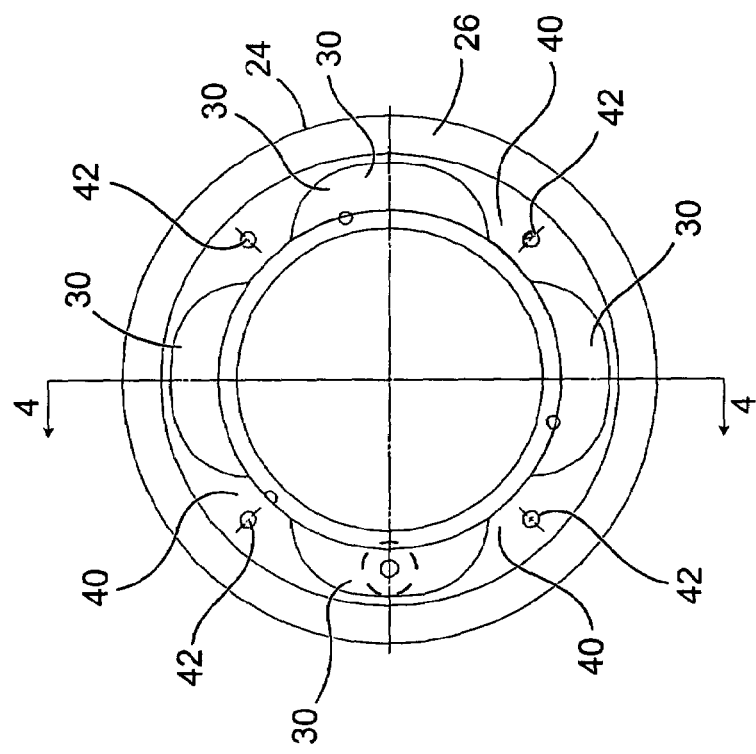
FIG. 3 is a rear end view of the housing of the lamp assembly of FIG. 1.
Figure 5:
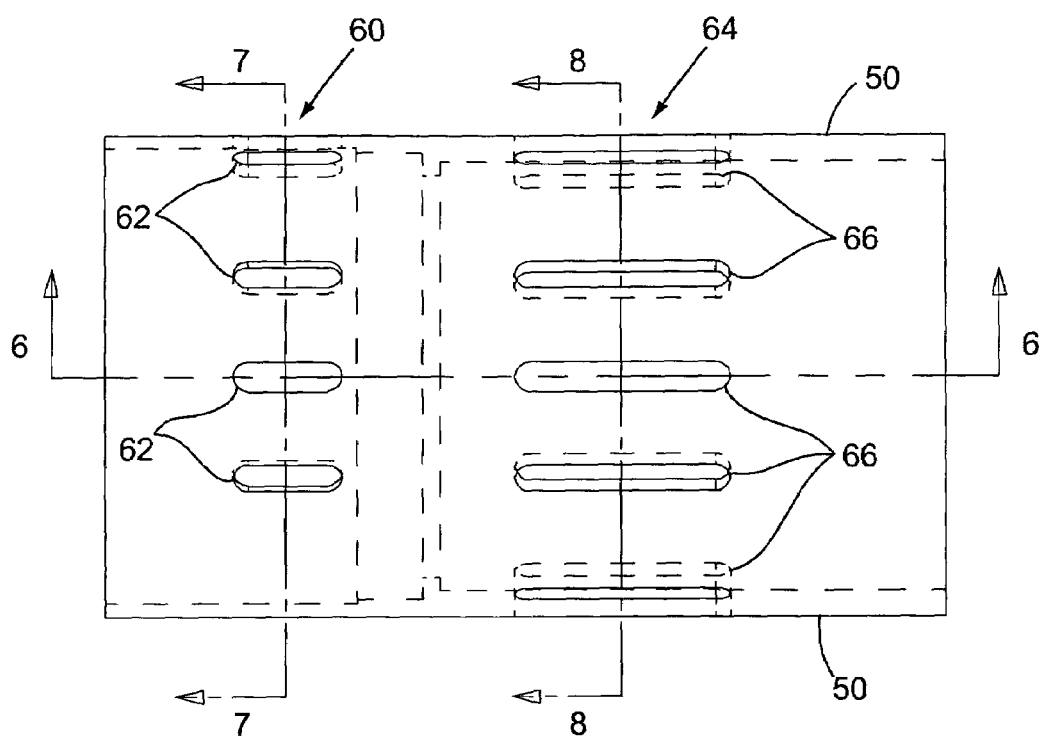
FIG. 5 is a side elevation view of the lens sleeve of the lamp assembly of FIG. 1.
Figure 6:
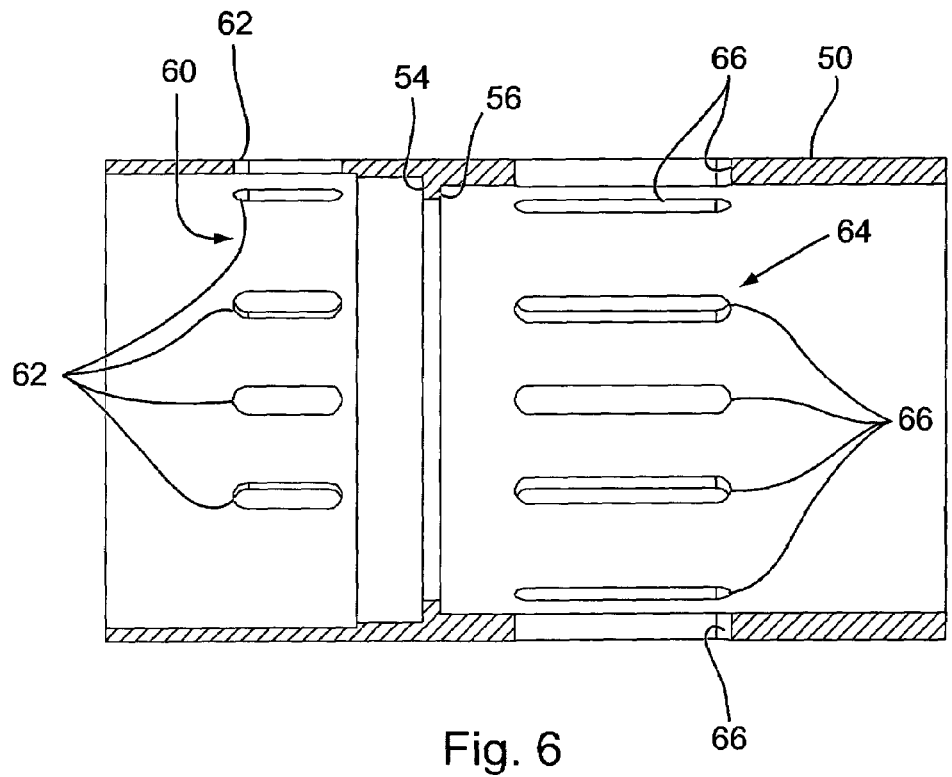
FIG. 6 is a view in section taken along the line 6—6 of FIG. 5.
Figure 8:
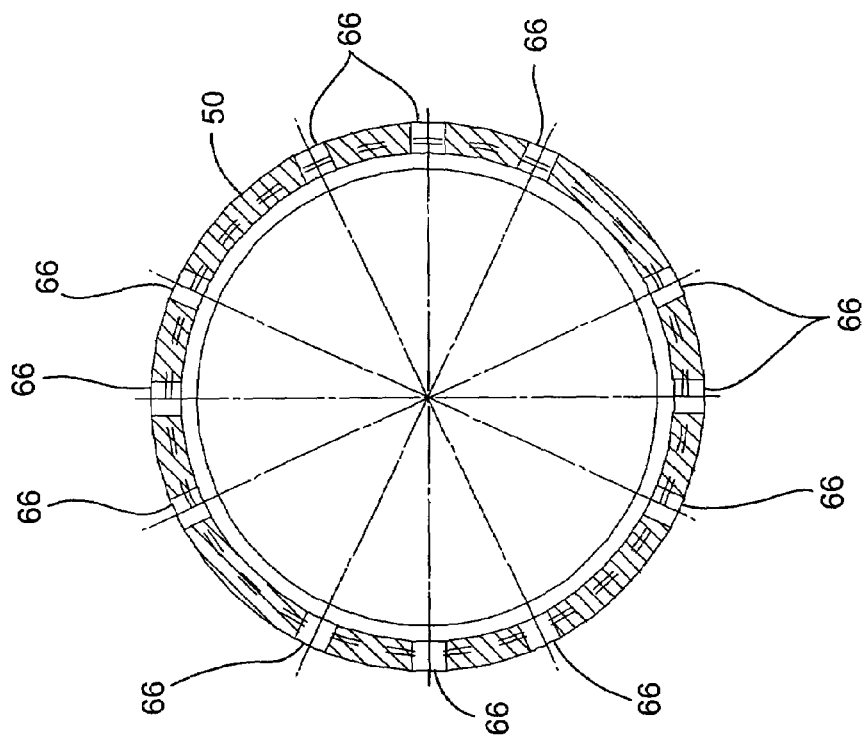
FIG. 8 is a view in section taken along the line 8—8 of FIG. 5.
Figure 7:
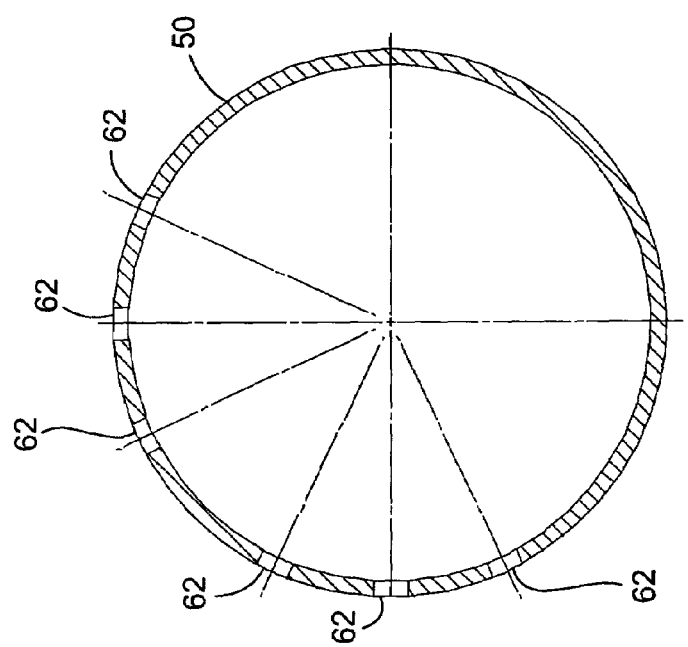
FIG. 7 is a view in section taken along the line 7—7 of FIG. 5.
Figure 9:
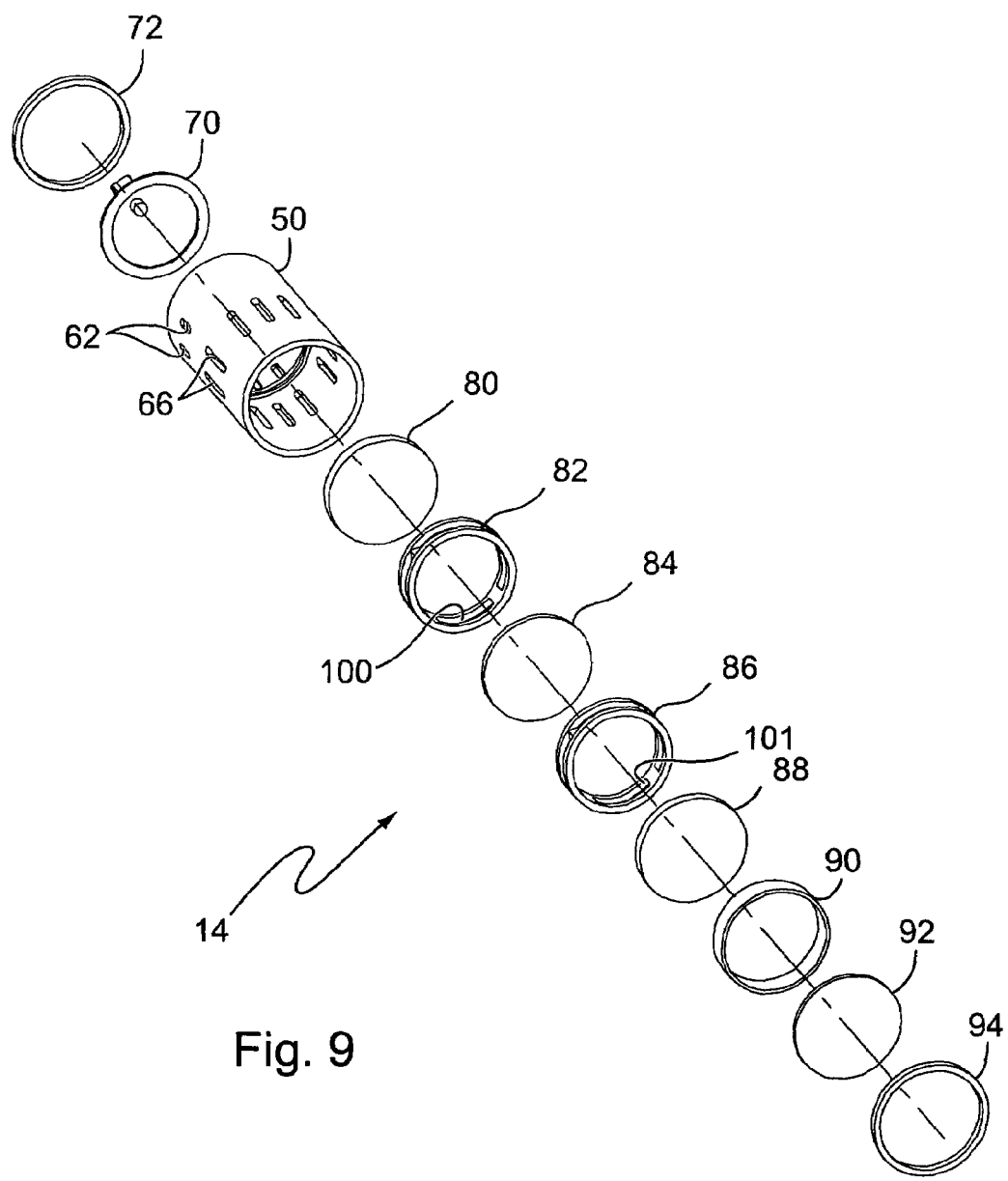
FIG. 9 is an exploded view of the light source and filter assembly of the lamp assembly of FIG. 1.
Figure 12:
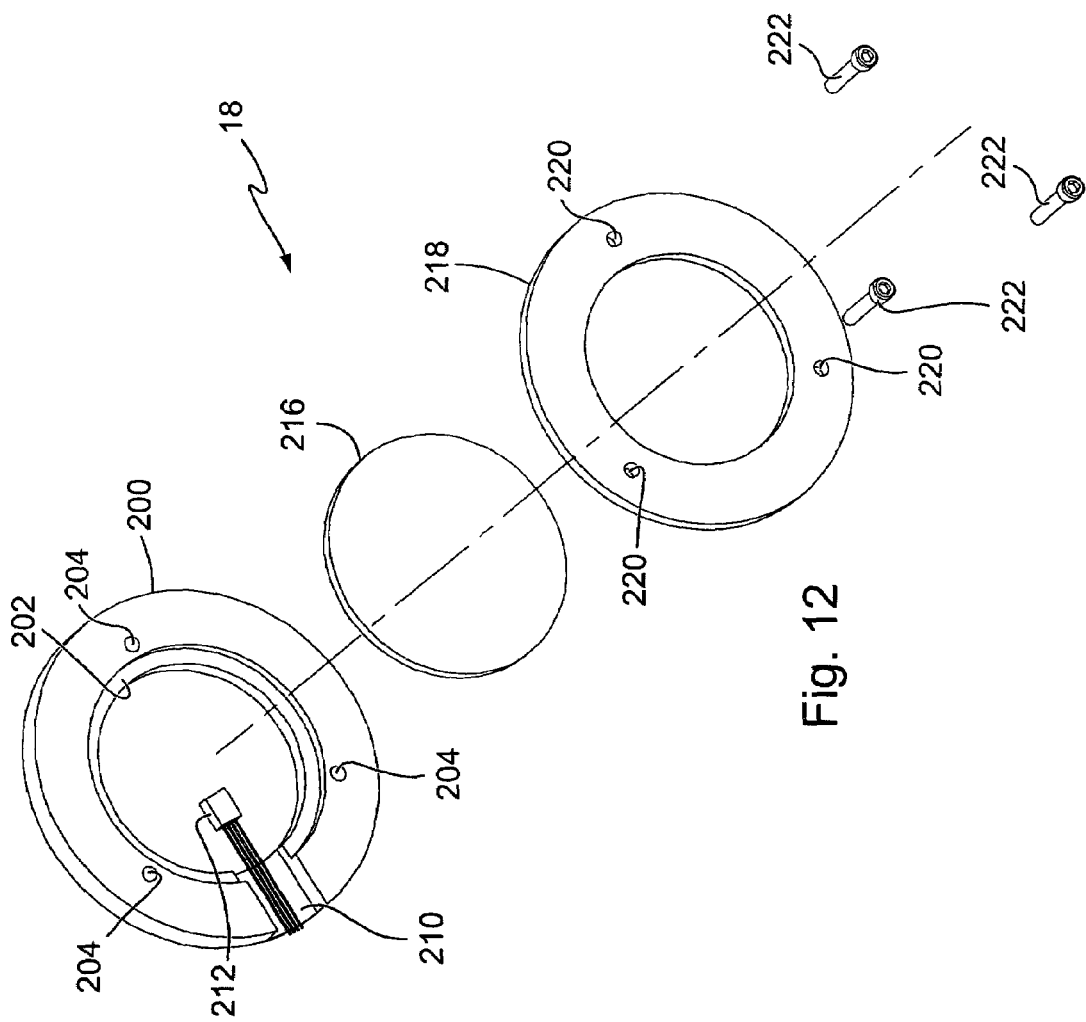
FIG. 12 is an exploded view of the sensor ring assembly of the lamp assembly of FIG. 1.
Figure 13:
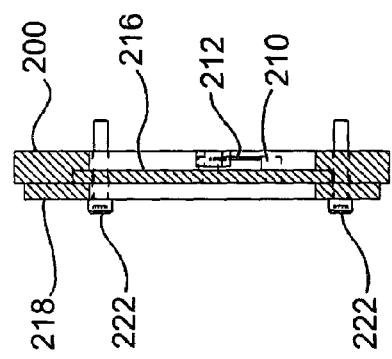
FIG. 13 is a section taken through the axis of the sensor ring assembly.
Figure 14:
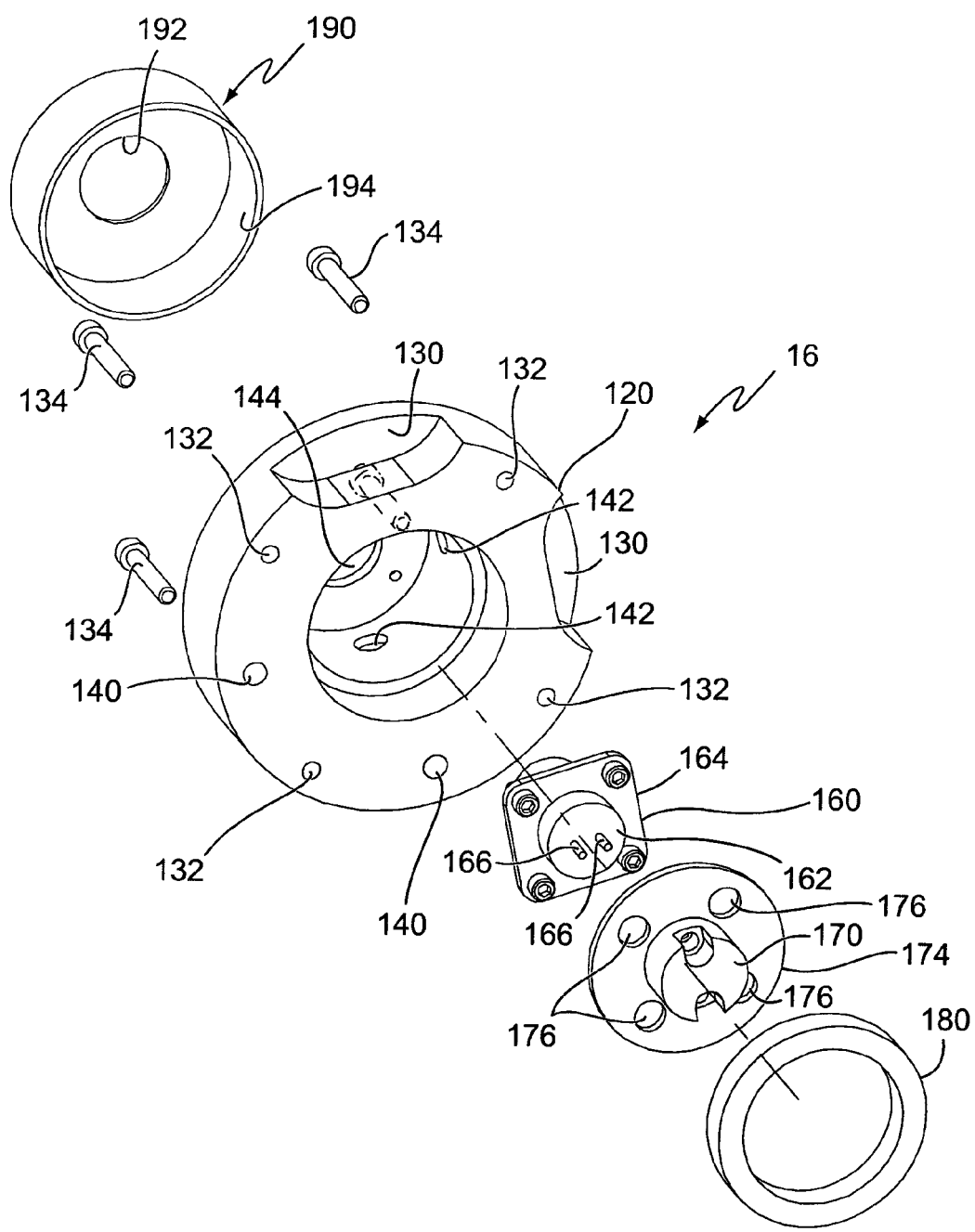
FIG. 14 is an exploded view of the end cap assembly of the lamp assembly of FIG. 1.
Figures 15, 17:
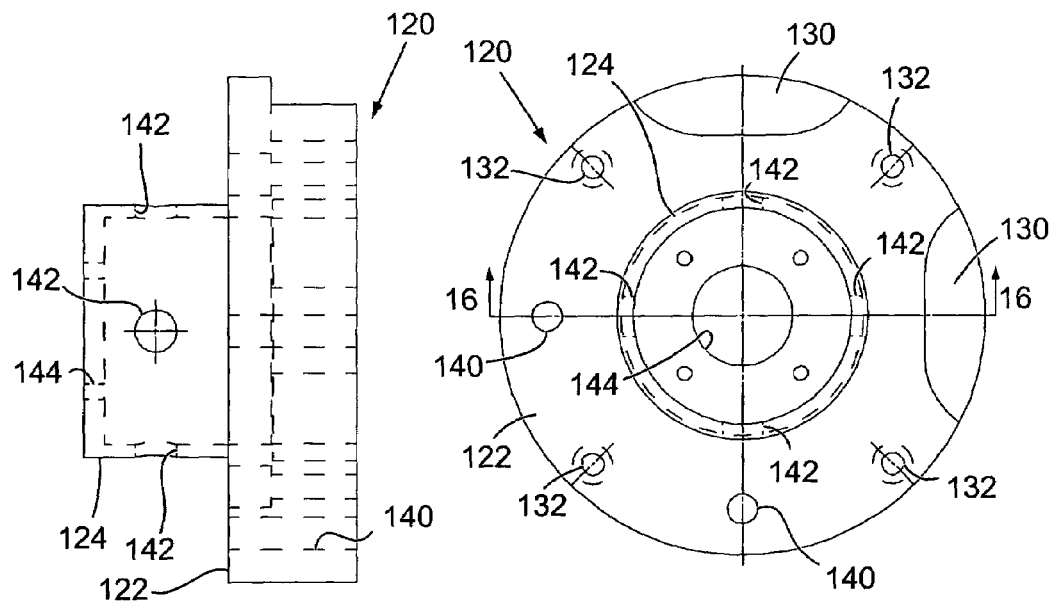
FIG. 15 is a front end elevation view of the end cap.
FIG. 17 is a side elevation view of the end cap.
Figure 16:
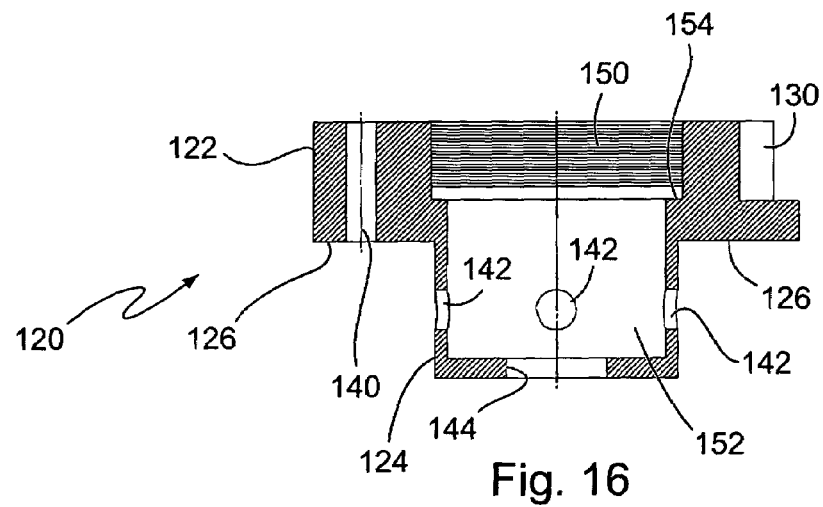
FIG. 16 is a view in section taken along the line 16—16 of FIG. 15.
Figure 18:
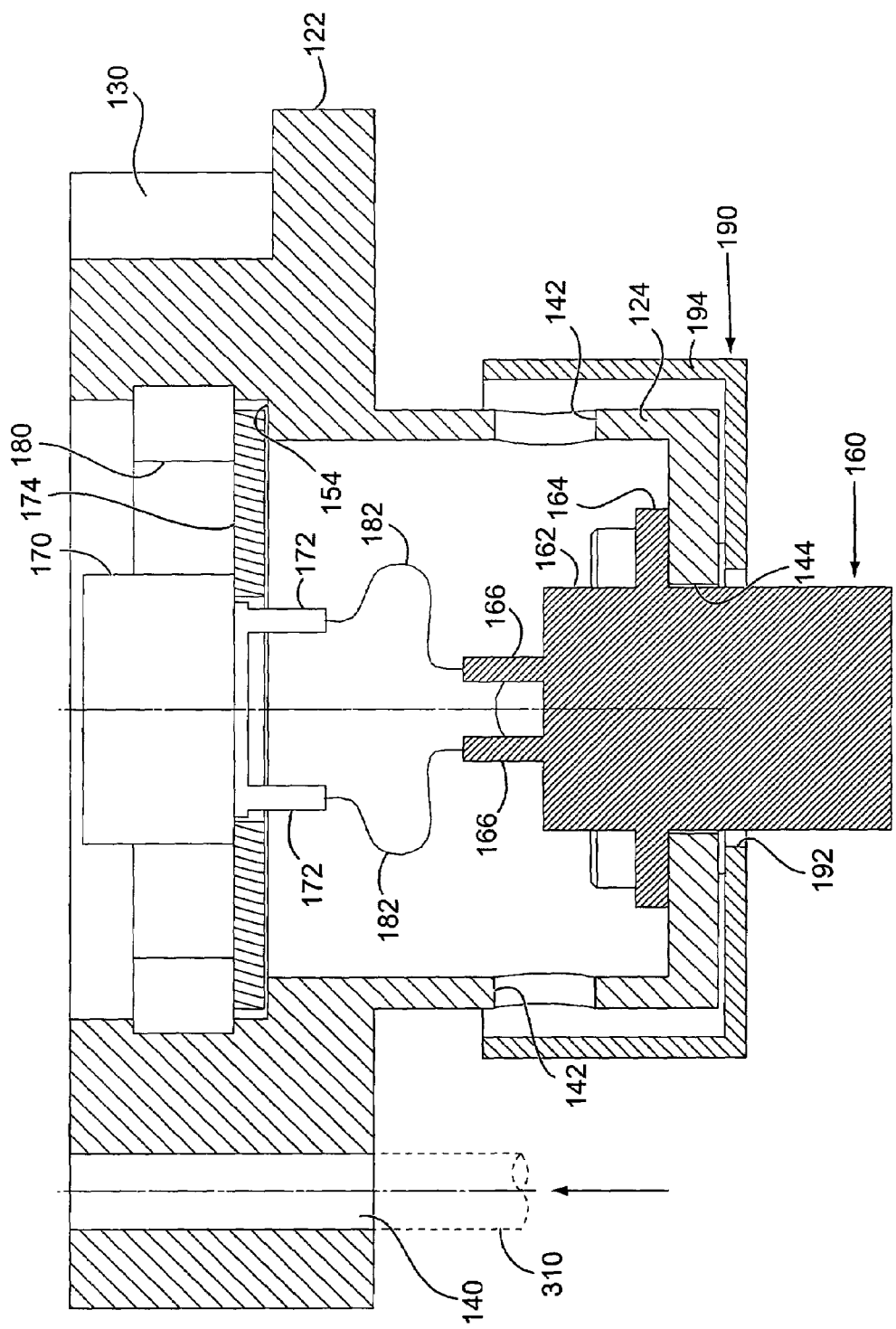
FIG. 18 is a view in section through the end cap including electrical components for the light source.
Figure 23:
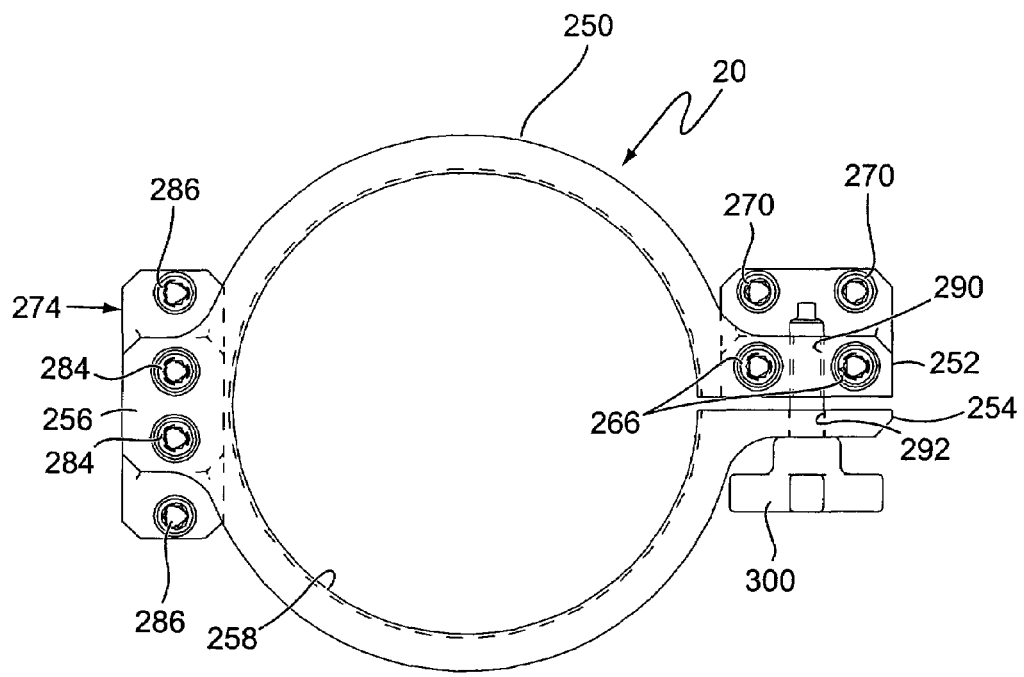
FIG. 23 is an end elevation view of the pivot mount assembly including the mounting brackets.
Figure 24:
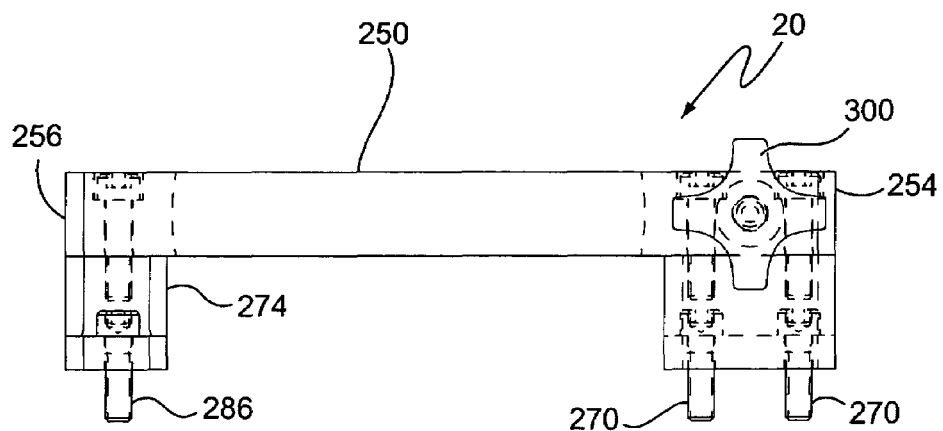
FIG. 24 is a side elevation view of the pivot mount assembly of FIG. 23.
Figure 26:
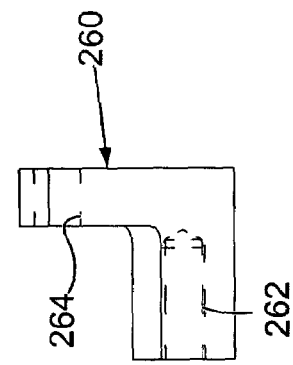
FIG. 26 is a side elevation view of the L-bracket of FIG. 25.
Figure 27:
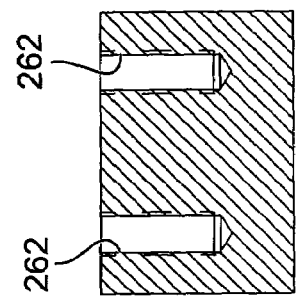
FIG. 27 is a view in section taken along the line 27—27 of FIG. 25.
Figure 25:
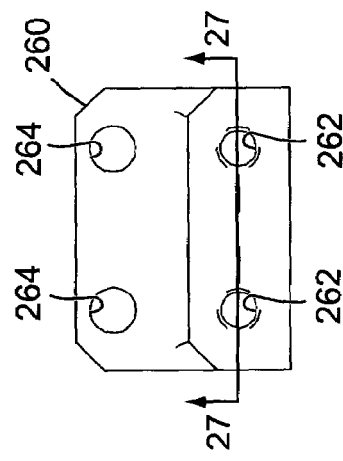
FIG. 25 is a front elevation view of an L-bracket of the pivot mount assembly.
Figure 28:
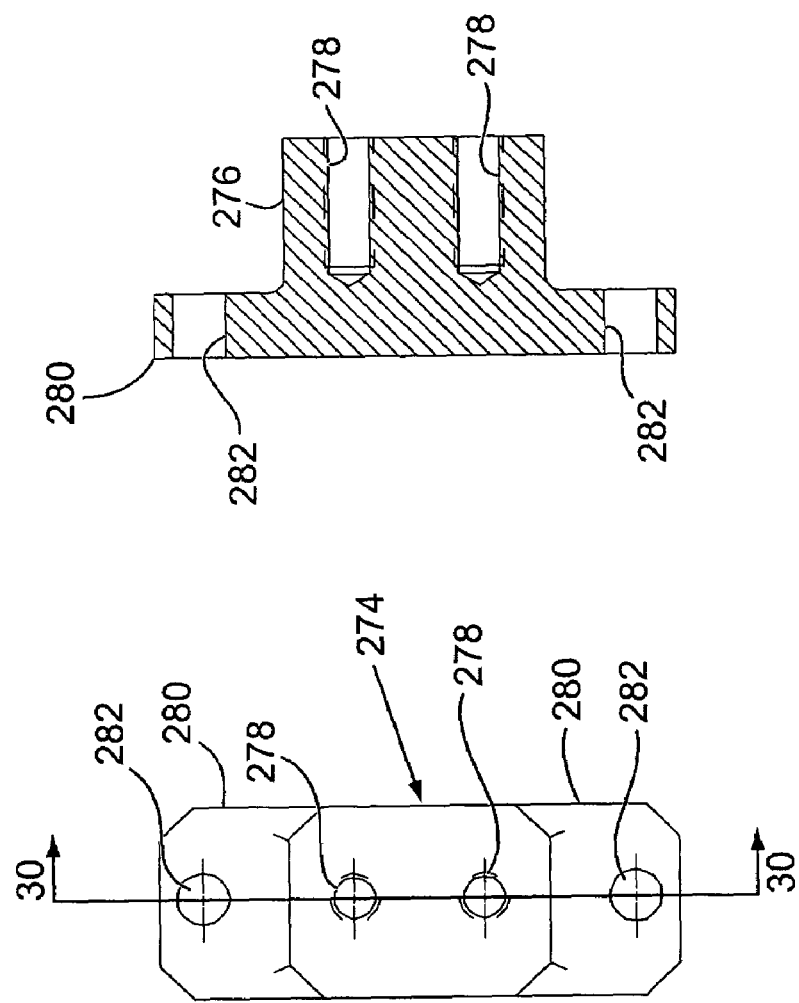
FIG. 28 is a side elevation view of a T-bracket of the pivot mount assembly.
Figure 28:
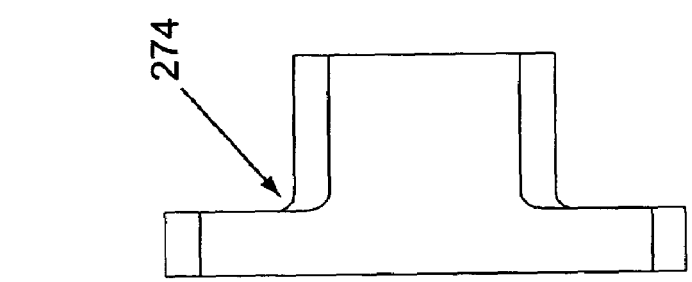

With reference to the drawings, there is shown preferred embodiments of a lamp assembly 10 of the present invention for use with pressure sensitive paint for measuring air pressure on surfaces, particularly for wind tunnel testing. The lamp assembly generally comprises a housing assembly 12, a light source and optical elements assembly 14, an end cap assembly 16, a sensor ring assembly 18, and a pivot mount assembly 20. The housing assembly 12 (FIGS. 1–4) further comprises a generally cylindrical, tubular-shaped body 24 having at its forward end a rounded, bulbous outer surface 26. Internally, the body 24 when viewed from the rear (FIG. 3) has a scalloped appearance due to elongated recesses 30 formed internally in the body wall. The recesses 30 are shown to be equally spaced circumferentially about the center longitudinal axis of the body. In this described embodiment, four such recesses are shown. Both the forward end 32 and rearward end 34 are open, such that the body itself is open internally throughout its length. At the forward end of the body there is an annular forward facing surface 36 and an annular recess 38 for mounting components as will be described. The rear end of the body has rearward facing surfaces 40 between the recesses 30, the surfaces 40 having threaded bolt holes 42 for mounting the end cap assembly 16 as will be described.

The light source and optical elements assembly 14 will be described with particular reference to FIGS. 1, 2, and 5–11. It comprises a generally cylindrical sleeve 50 having internal annular shoulders 54, 56 for mounting internal components as will be described. Two sets of slots are formed in the wall of the sleeve 50. The first set 60 comprises elongated slots 62 extending generally parallel to the longitudinal axis of the sleeve. The second set of slots 64 comprises elongated slots 66 extending generally parallel to the longitudinal axis of the sleeve. The slots 62, 66 are formed in groups of three circumferentially about the center axis of the sleeve. As will be further described, the groups of slots line up with recesses 30 of the body 24 with the light source and optical elements assembly 14 mounted within the housing assembly 12.

The sleeve 50 houses the light source and optical elements of the assembly 14. More specifically, a light source 70 is mounted in the rear portion of the sleeve 50. The light source 70 comprises a quartz halogen bulb assembly with integrated reflector such as an Osram DDS lamp. In this application, the lamp current is run above the normally specified level to achieve an emitted light color temperature above about 3000° K to provide adequate light in the blue end of the emitted spectrum for the measurements to occur. The forward end of the light source rests against the annular flange 54 and is secured against the flange by a threaded retaining nut 72.

The forward portion of the sleeve 50 contains the optical elements for the lamp. A fused silica window 80 which may be a Corning 7940 is located against the annular flange 56. A spacer 82 is positioned forwardly of the window, a heat absorption filter 84 is positioned forwardly of the spacer 82, another spacer 86 is positioned forwardly of the filter 84, an optical bandpass interference filter 88 is positioned forwardly of the spacer 86, a spacer 90 is positioned forwardly of the filter 88, a diffuser 92 is positioned forwardly of the spacer 90, and the entire optics assembly comprising these various components is held in place by a retaining nut 94 at the front of the sleeve 50. The quartz halogen bulb is allowed to run hot to enable the halogen cycle to recycle tungsten, that is normally deposited on the internal bulb wall, back to the filament. If the bulb wall is cooled, the halogen cycle is interrupted and the internal bulb surface quickly becomes coated with tungsten thereby degrading light output. The fused silica window 80 shields the quartz halogen bulb from the cooling air flow. In addition, it absorbs infrared radiation beyond about 3.5 microns wavelength, preventing it from passing to the heat absorption filter 84, which cannot tolerate the entire lamp heat load without breaking. The spacers 82, 86 have circumferential openings 100, 101, respectively, to allow for the passage of air into chambers 102, 104, respectively, within the spacers for cooling the lamp housing as will be further described. In the second stage of the two step heat absorption process, the heat absorption filter 84 absorbs radiant energy beyond about 700 nm, further reducing the radiant heat flux incident on the bandpass interference filter 88, whose performance is temperature sensitive. The reduced radiant flux coupled with the cooling air flow stabilizes the temperature of the bandpass interference filter 88 at an acceptable level so that it transmits light in a consistent spectral band at the desired wavelength of light, which in this described embodiment is blue, at approximately 450 nanometers. A particular bandpass filter that may be used for this purpose is made by Barr™. The subsequent diffuser 92 spreads the light field into a cone of light that is nominally uniform in space and stable in intensity. The spacer 90 fills space that can accommodate optical elements of varying thicknesses or additional optical elements as may be desirable depending on the application.

The entire light source and optical elements assembly 14, comprising the sleeve 50, light source 70, and various optical elements, is mounted within the body 24 of the housing assembly 12 (FIG. 2) with the forward end of the sleeve 50 secured against the annular shoulder 38 of the body. So positioned, the elongated recesses 30 surround the assembly 14 and provide airflow channels as will be further described.

The end cap assembly will be described with particular reference to FIGS. 1, 2, and 14–18. The end cap assembly 16 comprises an end cap 120 which is generally T-shaped having a generally annular base portion 122 and a rearwardly extending hub portion 124. The base 122 and hub 124 define an annular flange 126. The end cap is hollow in the interior, and has side recesses 130 formed in the flange 126 that open to the rear of the flange. The flange has holes 132 therethrough that align with the holes 42 in the rear end of the body 24 of the housing assembly 12 to receive bolts 134 for mounting the end cap assembly 16 to the housing assembly 12. The flange 126 also has holes 140 extending in an axial direction through the flange that function as air inlets as will be further described. The walls of the hub 124 have diametrically opposed side openings 142 and an end opening 144. Internally, the end cap has a forward portion 150 and a rear portion 152, the portions divided at a shoulder 154.

A connector receptacle 160 has a cylindrical hub 162 and a flange 164 that extends outwardly from the hub. Electrical connectors 166 are mounted in the hub for supplying electrical power to the light source. The connector receptacle 160 is mounted in the end cap with the hub extending through the opening 144 of the cap and with the electrical connector pins 166 positioned within the cap. A bulb socket 170 has electrical connector pins 172 and is mounted to a retaining disk 174. The retaining disk 174 has holes 176 extending through the disk to allow for the passage of air as will be further described. The disk and socket are mounted within the end cap with the outer perimeter of the disk positioned against the shoulder 154. A retaining nut 180 secures the disk and socket in place. The pins 166 of the connector receptacle 160 are electrically connected to the pins 172 of the socket 170 by suitable wiring 182.

With the end cap assembly 16 secured to the housing assembly 12 by the bolts 134, the socket 170 is in alignment with the bulb 70 to make electrical connection with the bulb such that a source of electrical power (not shown) connected to the connector receptacle 160 is delivered through the electrical wiring 182 and the socket 170 to the bulb 70. Moreover, the air inlet holes 140 are in alignment with adjacent longitudinal airflow channels 184 between the outer wall of the sleeve 50 of the assembly 14 and the internal wall of the body 24 of the assembly 12 formed by adjacent longitudinal recesses 30.

A light guard in the form of a cap 190 having a central opening 192 and an annular skirt 194 is placed over the outer end of the connector receptacle 160 to trap unfiltered broadband light that might escape from the back of the lamp housing and scatter forward into the measurement field, degrading the measurement. The skirt 194 extends forwardly past the side openings 142 in the end cap but is spaced radially from the openings so as not to block the flow of air through the openings.

The sensor ring assembly 18 (FIGS. 1, 2, 12 and 13) is mounted at the front of the housing assembly 12. The sensor ring assembly comprises a ring 200 with an inwardly extending annular shoulder 202 and holes 204 which align with threaded holes 206 in the annular front face 36 of the body 24. The ring 200 has a radial groove 210 that receives the wiring for a photosensor 212 which is part of an electrical control circuit (not shown) for stabilizing the light from the light source. A glass cover 216 is positioned against the annular shoulder 202, and a retaining ring 218 is placed over the glass cover 216. The ring 218 has holes 220 that align with the holes 204 of the ring 200 and the threaded holes 206 of the body 24 to receive bolts 222 for mounting the sensor ring assembly 18 to the housing assembly 12.

The pivot mount assembly 20 will be described with particular reference to FIGS. 1, 2 and 19–30. The pivot mount assembly 20 comprises a split ring 250 having opposing flanges 252, 254, and a flange 256 at the opposite side of the ring from the flanges 252, 254. The internal surface 258 has a concave contour of the same radius as the convex contour of the bulbous outer surface 26 of the body 24 on which the ring 250 is mounted. An L-block 260 has threaded holes 262 in one leg of the L, and holes 264 in the other leg of the L. The threaded holes 262 receive bolts 266 that extend through mating holes 268 in the flange 252 of the ring to mount the L-block to the ring 250. The holes 264 receive bolts 270 for mounting the pivot mount assembly to an appropriate structure when the lamp assembly is in use. A T-block 274 has a center hub portion 276 with threaded holes 278 and an annular shoulder portion 280 having holes 282. The threaded holes 278 align with holes 283 in the flange 256 of the split ring and receive bolts 284 to mount the split ring to the T-block. The holes 282 receive bolts 286 for mounting the pivot mount assembly to a suitable structure. The flange 252 has a threaded hole 290 that aligns with a hole 292 in the flange 254 to receive a locking bolt having a fluted knob 300 so that the locking bolt may be turned by hand to either tighten the split ring onto the bulbous portion of the body 24, or loosen the split ring to allow pivotal adjustment of the body 24, and all of the components mounted to the body, within the split ring.

In operation of the lamp assembly 10 of the invention, the lamp assembly is mounted to an appropriate structure by the pivot mount assembly 20. Such a structure may be a wall of a wind tunnel used for measuring air pressure on the surfaces of an air vehicle under test. The lamp assembly is mounted by the blocks 260, 274 bolted to the test structure. The lamp is positioned with respect to an opening in the test structure to direct the light from the lamp onto the surface of the test air vehicle in a selected manner. The pivot mount assembly 20 of the invention makes positioning of the lamp exceptionally easy and accurate by simply loosening the split ring 250 using the knob 300 and pivoting the lamp housing by pivotally sliding the bulbous portion 26 of the body 24 within the mating concave surface of the split ring. Once positioned, the split ring is clamped onto the bulbous surface by use of the knob 300 to firmly hold the lamp in the selected position. Preferably, the bulbous portion of the body is located at the forward end of the body so that pivotal adjustment of the body within the split ring creates little lateral movement of the lamp at the output aperture. The entire housing assembly, and the components mounted to the housing assembly, may be removed as a unit from the pivot mount assembly without dismounting the pivot mount assembly from the test structure by loosening the split ring so as to disengage the ring sufficiently from the bulbous portion to allow the housing assembly to be withdrawn axially from the split ring.

The lamp is electrically powered by delivering suitable electrical power to the connector receptacle 160 which is fed to the bulb socket 170 by the wiring 182, and to the bulb 70. The light from the bulb travels through the optical elements, as previously explained, to emit at the forward end of the lamp a light beam suitable for pressure measurements using pressure sensitive paint. As previously explained, with this described embodiment the light preferably is in the blue wavelength. The lamp structure provides for the proper wavelengths of light with very little or no leakage in the detection band.

The lamp housing assembly of the invention provides exceptional cooling of the optical elements. A suitable air supply (indicated at 310) is connected at the inlet openings 140 in the end cap 120. Air entering the openings 140 flows into two adjacent longitudinal air channels 184 formed by recesses 30 in the inner wall of the body 24, as previously explained. From these longitudinal channels, the air flows through the openings 62 in the wall of the sleeve 50 and into a chamber 320 which houses the bulb-reflector assembly (light source) 70. The air in the chamber 320 flows about the back of the bulb reflector, but not the bulb itself, and exits through the openings 176 in the socket retaining disk 174 into a chamber 322 in the end cap. From there, the air exits through the side openings 142 in the end cap. Some of the air flow entering the channels 184 also passes through the openings 66 in the sleeve 50 that are aligned with adjacent recesses 30. Some of the air that passes through the openings 66 pass through the openings 100 in the spacer 82, and some of the air that passes through the openings 66 passes through the openings 101 in the spacer 86. Thus, some of the air from the airflow channels 184 enters a chamber 324 within the spacer ring 82 between the fused silica window 80 and the heat absorption filter 84, and other air from the air flow channels 184 enters a chamber 326 within the spacer 86 between the heat absorption filter 84 and the interference light filter 88. The air passing through the chambers 324, 326 cools the optical elements of the lamp assembly. The air from the chambers 324, 326 exits through openings 66 in the opposite side of the sleeve, whereupon it enters air flow channels 330 defined by recesses 30 at the opposite side of the housing from where the air entered the lamp assembly, and exits the lamp assembly through the recesses 130 in the end cap which align with the outlet air flow channels 330.

These multiple air flow paths through the lamp assembly that move the air through multiple chambers to cool the connector, bulb socket, bulb reflector, and various optical elements provides exceptional cooling of the lamp components, while also providing a modular structure for easy assembly, repair, and bulb replacement.

The bulb-reflector assembly is monolithic and can be replaced as a unit. Beyond this, the entire light source and optical elements assembly and end cap assembly can be removed from the housing assembly, without dismounting the housing assembly from the test structure or even disturbing the adjustable position of the housing assembly relative to the test structure. To replace the bulb-reflector assembly, the entire end cap assembly as a unit is detached from the housing assembly by removing the bolts 134. Removing the end cap assembly disconnects the socket 170 from the bulb base while the bulb-reflector assembly is retained within the light source and optical elements assembly 14 by the retaining nut 72. With the end cap assembly removed, the entire light source and optical elements assembly 14 can be removed from within the housing assembly by simply extracting the entire assembly 14 rearwardly from the housing assembly. The bulb-reflector assembly 70 may be replaced by removing the retaining nut 72, replacing the bulb-reflector assembly, and replacing the retaining nut. The assembly 14 is then inserted as a unit back into the housing, and the end cap assembly is mounted to the rear of the housing. All of this is accomplished easily without disturbing the pivot mount assembly 20 or the position of the housing within the mount. Also, with the light source and optical elements assembly removed from the housing, access to all of the optical elements is made easy by simple removal of the retaining nut 94 at the front of the assembly.

Thus, there has been described a lamp assembly for measuring pressure on a test air vehicle using pressure sensitive paint, which by its structure and configuration (1) provides exceptional cooling for the various optical elements and the housing, (2) provides a combination of optical filters that minimizes heat load on the interference filter, yet provides a high beam intensity at the desired wavelength, (3) provides a mounting structure for the lamp assembly that allows the lamp assembly to be accurately aimed and positioned with little translation of the output aperture, and (4) provides easy access to the internal components, including the bulb and optical elements, without disturbing the housing assembly or even the positioning of the housing assembly within the pivot mount.

While the present invention has been described by reference to specific embodiments and specific uses, it should be understood that other configurations and arrangements could be constructed, and different uses could be made, without departing from the scope of the invention as set forth in the following claims.

What is claimed is:

1. A lamp assembly for use in measuring pressure on a surface provided with pressure sensitive paint, said lamp assembly comprising:
   a housing;
   a light source supported within the housing;
   optical elements supported within the housing, said optical elements adapted for emitting light from said light source onto said surface for measuring pressure at said surface;
   a sensor ring mounted at a front of the housing adapted to stabilize emitted light from the light source; and,
   a cooling system, said cooling system further comprising a first airflow path within said housing for cooling said light source housing, and a second airflow path for cooling said optics.

2. The lamp assembly of claim 1 further comprising:
   a sleeve mounted within said housing, said sleeve having openings in its side wall, said housing and sleeve defining channels therebetween for the passage of air, at least one of said first and second airflow paths including at least portions of said channels.

3. The lamp assembly of claim 2 wherein said light source and said optical elements are mounted within said sleeve, and said sleeve further comprises first openings in its side wall in the first airflow path for cooling said light source housing, and second openings in its side wall within second airflow path for cooling at least some of said optics.

4. The lamp assembly of claim 3 further comprising a light source chamber within said sleeve in which is mounted said light source, said light source chamber being in said first airflow path.

5. The lamp assembly of claim 1 further comprising an end cap assembly behind said light source and having at least one air inlet for the introduction of air to at least one of said first and second airflow paths, said lamp assembly further comprising at least one air outlet for the exiting of the air from at least one of said first and second airflow paths.

6. The lamp assembly of claim 4 wherein said light source further comprises a light source reflector, and wherein air in the first airflow path enters said light source chamber and then flows about said light source reflector before exiting said chamber.

7. The lamp assembly of claim 1 wherein said housing is generally cylindrical, the internal surface of the housing having longitudinal circumferentially spaced recesses, said recesses defining at least a portion of at least one of said first and second airflow paths.

8. The lamp assembly of claim 5 wherein said end cap is recessed to provide a gap between said end cap and said housing, said gap being in at least one of said first and second airflow paths.

9. The lamp assembly of claim 5 further comprising a bulb socket mounted within said end cap, and a connector mounted in said end cap rearwardly of said socket, said socket, connector, and end cap defining at least in part a chamber in at least one of said first and second airflow paths.

10. A lamp assembly for use in measuring pressure on a surface provided with pressure sensitive paint, said lamp assembly comprising:
    a housing;
    a subassembly mounted within said housing, said subassembly comprising a sleeve, a light source, and optical elements, said light source and optical elements mounted within said sleeve, with said optical elements in the light beam emitted by said light source; and adapted for measuring pressure at said surface a sensor ring mounted at a front of the housing adapted to stabilize emitted light from the light source; and, airflow paths within said sleeve for the flow of air past said light source and at least some of said optical elements.

11. The lamp assembly of claim 10 wherein said sleeve has an outer wall extending generally in the direction of said light beam from said light source, said outer wall having openings within said airflow paths.

12. The lamp assembly of claim 11 further comprising first and second airflow paths within said sleeve, the wall of said sleeve having first openings in said first airflow path and second openings in said second airflow path, said light source being in said first airflow path and at least some of said optical elements being in said second airflow path.

13. The lamp assembly of claim 12 wherein the directions of said first and second airflow paths are generally transverse of the direction of the light beam from the light source.

14. The lamp assembly of claim 13 further comprising first and second air outlets, air from said first airflow path exiting the lamp assembly through said first air outlet, and the air from said second airflow path exiting the lamp assembly through said second air outlet.

15. The lamp assembly of claim 14 further comprising airflow channels between said housing and said sleeve, an air inlet to said lamp assembly, said air inlet communicating with at least one of said airflow channels, and at least one other of said airflow channels communicating with at least one of said air outlets.

16. The lamp assembly of claim 15 wherein said at least one airflow channel that communicates with said air inlet also communicates with at least one of said airflow paths, and the other of said at least one airflow channels that communicates with at least one of said air outlets communicates with at least one of said airflow paths.

17. The lamp assembly of claim 16 wherein said airflow channels extend generally parallel to said light beam from said light source.

18. A lamp assembly for use in measuring pressure on a surface provided with pressure sensitive paint, said lamp assembly comprising:
   a housing;
   a light source supported within the housing;
   optical elements supported within the housing, said optical elements adapted for emitting light of a specified wavelength from said light source onto said surface for measuring induced fluorescent radiation at said surface;
   a sensor ring mounted at a front of the housing adapted to stabilize emitted light from the light source; and,
   a cooling system, said cooling system further comprising air flow paths for cooling said light source and said optics.

19. The lamp assembly of claim 18 wherein said light source further comprises a quartz halogen bulb.

20. The lamp assembly of claim 18 wherein said light source further comprises a bulb and reflector assembly.

21. The lamp assembly of claim 20 wherein said optical elements further comprise a fused silica window for shielding the bulb from the cooling air flow.

22. The lamp assembly of claim 21 wherein said fused silica window absorbs infrared radiation beyond about 3.5 microns wavelength.

23. The lamp assembly of claim 18 wherein said optical elements further comprise a heat absorption filter that absorbs radiant energy beyond about 700 nm.

24. The lamp assembly of claim 18 wherein said optical elements further comprise a diffuser for spreading the light field into a cone of light that is nominally uniform in space and stable in intensity.

25. The lamp assembly of claim 21 wherein said light source comprises a quartz halogen bulb, and said fused silica window shields the quartz halogen bulb from cooling air flow.

26. The lamp assembly of claim 18 wherein said optical elements further comprise a bandpass interference filter, and a heat absorption filter that reduces the radiant heat flux incident on the bandpass interference filter.

27. The lamp assembly of claim 18 wherein said light source further comprises an integrated bulb with reflector, at least one of said air flow paths cooling the back side of said reflector but not said bulb.

28. The lamp assembly of claim 18 wherein said light source further comprises a bulb and reflector assembly, and wherein said optical elements further comprise:
   a fused silica window for shielding the bulb of the bulb and reflector assembly from the cooling air flow;
   a heat absorption filter that absorbs radiant energy beyond a selected wavelength;
   a bandpass interference filter; and
   a diffuser for spreading the light field from said light source and other optical elements into a cone of light that is uniform and stable in intensity;
   said fused silica window absorbing infrared radiation beyond a selected wavelength, and said heat absorption filter absorbing radiant energy beyond a selected wavelength, thereby reducing the radiant heat flux incident on the bandpass interference filter.

29. The lamp assembly of claim 28 wherein said fused silica window absorbs infrared radiation beyond about 3.5 microns wavelength.

30. The lamp assembly of claim 29 wherein said heat absorption filter absorbs radiant energy beyond about 700 nm.

31. The lamp assembly of claim 30 wherein said bandpass interference filter transmits light at a wavelength in the blue light range.

32. The lamp assembly of claim 28 wherein the bulb of the bulb and reflector assembly is a quartz halogen bulb with integrated reflector assembly.

* * * * *